US011123865B2

(12) United States Patent
Anderson-Sprecher

(10) Patent No.: US 11,123,865 B2
(45) Date of Patent: *Sep. 21, 2021

(54) USING OBJECT OBSERVATIONS OF MOBILE ROBOTS TO GENERATE A SPATIO-TEMPORAL OBJECT INVENTORY, AND USING THE INVENTORY TO DETERMINE MONITORING PARAMETERS FOR THE MOBILE ROBOTS

(71) Applicant: Boston Dynamics, Inc., Waltham, MA (US)

(72) Inventor: Peter Elving Anderson-Sprecher, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 274 days.

This patent is subject to a terminal disclaimer.

(21) Appl. No.: 16/228,423

(22) Filed: Dec. 20, 2018

(65) Prior Publication Data

US 2019/0143515 A1 May 16, 2019

Related U.S. Application Data

(63) Continuation of application No. 14/850,909, filed on Sep. 10, 2015, now Pat. No. 10,195,740.

(51) Int. Cl.
*B25J 9/16* (2006.01)
*G05D 1/02* (2020.01)
(Continued)

(52) U.S. Cl.
CPC ............. *B25J 9/1664* (2013.01); *B25J 5/00* (2013.01); *B25J 9/1694* (2013.01); *G01B 11/14* (2013.01);
(Continued)

(58) Field of Classification Search
None
See application file for complete search history.

(56) References Cited

U.S. PATENT DOCUMENTS 6,895,301 B2 * 5/2005 Mountz ................ G05D 1/0274
700/113
6,965,876 B2 11/2005 Dabbiere
(Continued)

FOREIGN PATENT DOCUMENTS

CN 104470685 A 3/2015
CN 104570771 A 4/2015
(Continued)

OTHER PUBLICATIONS

Theodoridis, T., & Hu, H. (2009). Intelligent Security Robots: A Survey. Univ. Essex, Colchester, Tech. Rep. CES-503. 31 pages.
(Continued)

*Primary Examiner* — John C Kuan
(74) *Attorney, Agent, or Firm* — Wolf, Greenfield & Sacks, P.C.

(57) ABSTRACT

Methods, apparatus, systems, and computer-readable media are provided for generating a spatio-temporal object inventory based on object observations from mobile robots and determining, based on the spatio-temporal object inventory, monitoring parameters for the mobile robots for one or more future time periods. Some implementations relate to using the spatio-temporal object inventory to determine a quantity of movements of objects that occur in one or more areas of the environment when one or more particular criteria are satisfied—and using that determination to determine monitoring parameters that can be utilized to provide commands to one or more of the mobile robots that influence one or
(Continued)

more aspects of movements of the mobile robots at future time periods when the one or more particular criteria are also satisfied.

14 Claims, 8 Drawing Sheets

(51) Int. Cl.
    *G01C 21/00*     (2006.01)
    *G06Q 10/06*     (2012.01)
    *G01B 11/14*     (2006.01)
    *B25J 5/00*     (2006.01)
    *G06K 9/00*     (2006.01)
    *G06K 7/10*     (2006.01)
    *G06Q 10/08*     (2012.01)

(52) U.S. Cl.
    CPC ........... *G01C 21/00* (2013.01); *G05D 1/0274* (2013.01); *G05D 1/0297* (2013.01); *G06K 9/00664* (2013.01); *G05D 2201/0216* (2013.01); *G06K 7/10376* (2013.01); *G06Q 10/06315* (2013.01); *G06Q 10/087* (2013.01); *Y10S 901/01* (2013.01)

(56) References Cited

U.S. PATENT DOCUMENTS

| | | |
|---|---|---|
| 9,205,886 B1 | 12/2015 | Hickman et al. |
| 2006/0184279 A1* | 8/2006 | Okamoto ............. G05D 1/0251 700/245 |
| 2008/0077511 A1 | 3/2008 | Zimmerman |
| 2009/0037244 A1 | 2/2009 | Pemberton |
| 2009/0210090 A1 | 8/2009 | Takemitsu et al. |
| 2010/0046791 A1 | 2/2010 | Glickman et al. |
| 2010/0049366 A1 | 2/2010 | Lee et al. |
| 2011/0052043 A1 | 3/2011 | Hyung et al. |
| 2013/0085625 A1* | 4/2013 | Wolfe .................. G06F 19/00 701/1 |
| 2014/0365258 A1 | 12/2014 | Vestal et al. |
| 2014/0379296 A1 | 12/2014 | Nathan |
| 2015/0127496 A1 | 5/2015 | Marathe et al. |
| 2016/0221191 A1 | 8/2016 | Ota |
| 2016/0239021 A1 | 8/2016 | Pous Andres et al. |

FOREIGN PATENT DOCUMENTS

| | | |
|---|---|---|
| CN | 104656084 A | 5/2015 |
| TW | 200732108 | 9/2007 |
| TW | 201124106 | 7/2011 |
| WO | 2008069498 | 6/2008 |
| WO | 2013071150 | 5/2013 |
| WO | 2014120180 | 8/2014 |

OTHER PUBLICATIONS

Hsieh, M. Ani, et al. "Biologically inspired redistribution of a swarm of robots among multiple sites." Swarm Intelligence 2.2-4 (2008): 121-141.

International Search Report and Written Opinion of PCT Serial No. PCT/US2016/051109; 14 pages; Dec. 16, 2016.

Taiwan Patent Office; Office Action in Application No. 105129390 dated Nov. 29, 2017 Nov. 29, 2017.

* cited by examiner

USING OBJECT OBSERVATIONS OF MOBILE ROBOTS TO GENERATE A SPATIO-TEMPORAL OBJECT INVENTORY, AND USING THE INVENTORY TO DETERMINE MONITORING PARAMETERS FOR THE MOBILE ROBOTS

CROSS-REFERENCE TO RELATED APPLICATIONS

This Application is a Continuation of U.S. application Ser. No. 14/850,909, filed Sep. 10, 2015, entitled "USING OBJECT OBSERVATIONS OF MOBILE ROBOTS TO GENERATE A SPATIO-TEMPORAL OBJECT INVENTORY, AND USING THE INVENTORY TO DETERMINE MONITORING PARAMETERS FOR THE MOBILE ROBOTS," the entire contents of which is incorporated herein by reference in its entirety.

BACKGROUND

Robots may be programmed to perform a variety of tasks such as, for example, autonomous or semi-autonomous navigation, manipulating objects (e.g., repositioning an object, altering an object, and/or picking up an object and moving it to a different location), transporting objects (without necessarily manipulating those objects), monitoring environmental conditions, functioning as "video conferencing on wheels", and so forth.

Moreover, various techniques have been proposed that utilize a robot to detect the positions of various objects in the robot's environment. For example, a robot may utilize one or more cameras, laser scanners, depth sensors, and/or other sensors to detect the positions of objects in its environment. However, one or more of those techniques may suffer from one or more drawbacks. For example, many techniques may not utilize object observations from a plurality of mobile robots in an environment to generate a spatio-temporal object inventory that enables tracking of the positions and/or orientations of objects in the environment. Additionally and/or alternatively, many techniques may not employ one or more certain techniques related to analyzing a spatio-temporal object inventory to generate monitoring parameters for robots at one or more future time periods and/or may not employ one or more certain techniques related to influencing future movement of robots based on the monitoring parameters. Additional and/or alternative drawbacks of the aforementioned techniques and/or other techniques may be presented.

SUMMARY

The present disclosure is generally directed to generating a spatio-temporal object inventory based on object observations from mobile robots and determining, based on the spatio-temporal object inventory, monitoring parameters for the mobile robots for one or more future time periods. Implementations of the technology disclosed herein may be useful in various environments, such as mixed human-automation environments where objects of an inventory may be moved into, out of, and/or within the environment by one or more humans of the environment.

Some implementations of the technology relate to using object observations from multiple mobile robots in an environment to generate a spatio-temporal object inventory of objects in the environment. The object observations each include at least an object identifier for a corresponding object and a measured object pose that indicates a pose of the corresponding object.

The spatio-temporal object inventory generated based on the object observations defines poses for each of a plurality of objects in the environment and corresponding measurement times for those poses. Accordingly, the model may define, for each of the objects, an initial pose of the object (e.g., based on a measured object pose of an initial object observation that has an object identifier that identifies the object), and optionally one or more subsequent poses for the object (e.g., based on measured pose values of subsequent object observations that identify the object and that vary from the measured pose value of the initial object observation by at least a threshold amount). As used herein, "pose" of an object may reference a position of the object only (e.g., a multidimensional coordinate), or may reference both the position of the object and an orientation of the object. In some implementations, one or more of the "poses" defined for an object in the spatio-temporal object inventory may indicate that the object is no longer present in the environment (i.e., indicating a position outside of the environment) and/or its location is unknown (i.e., indicating an unknown position).

In some implementations, a plurality of the observations used to generate the spatio-temporal model are from mobile robots that are already engaged in a task and/or idle robots (i.e., potentially moving, but non task engaged). In some implementations, the spatio-temporal model is continuously or periodically updated (each update constitutes "generating" of the model), based on newly received object observations, to reflect changes to the inventory in the environment (e.g., the movement of objects within the environment, the introduction of new objects into the environment, and/or or the removal of objects from the environment).

Some implementations of the technology relate to using the spatio-temporal object inventory to determine a quantity of movements of objects that occur in one or more areas of the environment (e.g., movements into the areas, movements out of the areas, and/or movements within the areas by at least a threshold amount) when one or more particular criteria are satisfied—and using that determination to determine monitoring parameters that can be utilized to provide commands to one or more of the mobile robots that influence one or more aspects of movements of the mobile robots at future time periods when the one or more particular criteria are also satisfied.

As one example, if it is determined, based on the spatio-temporal object inventory, that movement of objects in an area of the environment is relatively frequent when certain criteria are satisfied, a relatively large quantity of mobile robots may be explicitly directed to that area during a future time period when those criteria are also satisfied and/or one or more mobile robots may be directed to be more likely to select paths that encounter that area during the future time period. This may result in a greater quantity of object observations in that area by the mobile robots during the future time period, enabling the spatio-temporal object inventory to more accurately reflect the actual current state of the inventory. On the other hand, if it is determined that movement of objects in the area is relatively infrequent when certain other criteria are met, a relatively small quantity of mobile robots (or even none) may be explicitly directed to that area at a future time period when those other criteria are also met and/or one or more mobile robots may be directed to be less likely to select paths that encounter that area during the future time period. This may result in a lesser quantity of object observations in that area by the mobile robots during the future time period, thereby lessening the utilization of mobile robot resources overall and/or enabling the mobile robot resources to be directed to other tasks (and thereby utilized more efficiently).

In some implementations, a method may be provided that includes receiving, by a system of one or more computers, object observations from a plurality of mobile robots in an environment. A plurality of the object observations each include an object identifier for a corresponding object and a measured object pose for the object identifier that indicates an object pose of the corresponding object. The object identifier and/or the measured object pose may be determined based on sensor data from one or more sensors of a corresponding one of the mobile robots. The method further includes generating, by the system, a spatio-temporal object inventory based on the object identifiers, the measured object pose, and measurement times of the object observations. The spatio-temporal object inventory defines, for each of a plurality of objects indicated by the object identifiers of the object observations, one or more poses for the object and corresponding measurement times for the poses. The method further includes determining, by the system and based on the spatio-temporal object inventory, a quantity of movements of the objects that occurred when one or more criteria were satisfied. The movements of the objects include at least one of: movements of the objects into at least one area of the environment, and movements of the objects out of the area of the environment. The method further includes: determining, by the system and based on the quantity of the movements that occurred when the criteria were satisfied, one or more monitoring parameters for the mobile robots for one or more future time periods when the criteria are also satisfied; and providing, by the system to one or more of the mobile robots, commands based on the monitoring parameters. The commands influence one or more aspects of movements of the mobile robots at the future time periods and resultantly influence a quantity of the object observations for the area of the environment received at the future time periods.

This method and other implementations of technology disclosed herein may each optionally include one or more of the following features.

In some implementations, the one or more criteria include a particular temporal period and the method further includes determining, by the system, the movements of the objects occurred when the one or more criteria were satisfied based on determining the movements of the objects occurred during the particular temporal period. In some of those implementations, the particular temporal period is one of: one or more particular days of the week, one or more particular days of the year, or one or more time periods during one or more of the particular days of the week or the days of the year. In some implementations, determining the movements of the objects occurred when the one or more criteria were satisfied includes determining, by the system, that a movement of the movements of the object into the area occurred during the particular temporal period. In some of those implementations, determining that a movement of the movements of the object into the area occurred during the particular temporal period includes: determining that a first pose of the poses for the object is outside of the area and has a first corresponding measurement time of the corresponding measurement times that is temporally before the temporal period; and determining that a second pose of the poses for the object is within the area and has a second corresponding measurement time of the corresponding measurement times that is temporally within the temporal period. In some of those implementations, determining that a movement of the movements of the object into the area occurred during the particular temporal period includes: determining that no pose that is temporally before the time period is defined for the object in the spatio-temporal object inventory; and determining that a pose of the poses for the object is within the area and has a corresponding measurement time of the corresponding measurement times that is temporally within the time period. In some implementations, determining the movements of the objects occurred when the one or more criteria were satisfied includes determining, by the system, that a movement of the movements of the object out of the area occurred during the particular temporal period. In some of those implementations, determining that a movement of the movements of the object out of the area occurred during the particular temporal period includes: determining that a first pose of the poses for the object is inside the area and has a first corresponding measurement time of the corresponding measurement times that is temporally before the time period; and determining that a second pose of the poses for the object is outside of the area and has a second corresponding measurement time of the corresponding measurement times that is temporally within the temporal period.

In some implementations, the one or more criteria include presence of a group of one or more humans in the area and the method further includes receiving, by the system, human presence data indicating a plurality of temporal periods when the group of one or more humans were present in the area. In some of those implementations, the method further includes determining the movements of the objects occurred when the one or more criteria were satisfied based on determining the movements of the objects occurred during one of the temporal periods when the group was present in the area.

In some implementations, the one or more criteria include one or more particular quantities of one or more humans are present in the area and the method further includes receiving, by the system, human quantity data indicating a plurality of temporal periods when the one or more particular quantities of the one or more humans were present in the area. In some of those implementations, the method further includes determining the movements of the objects occurred when the one or more criteria were satisfied based on determining the movements of the objects occurred during one of the temporal periods when the one or more particular quantities were present in the area.

In some implementations, the one or more criteria include inventory criteria of the environment and the method further includes determining the movements of the objects occurred when the one or more criteria were satisfied based on determining that the object movements occurred when the inventory criteria was present in the environment. In some of those implementations, the inventory criteria of the environment is inventory criteria restricted to the area of the environment.

In some implementations, the area is a subset of the environment.

In some implementations, the commands that influence one or more aspects of movements of the mobile robots at the future time periods based on the monitoring parameters include commands that direct the mobile robots to the area during the future time periods.

In some implementations, the commands that influence one or more aspects of movements of the mobile robots at the future time periods based on the monitoring parameters include commands that increase the likelihood that the mobile robots will select a path that encounters the area during the future time periods.

Other implementations may include a non-transitory computer readable storage medium storing instructions executable by one or more processors to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
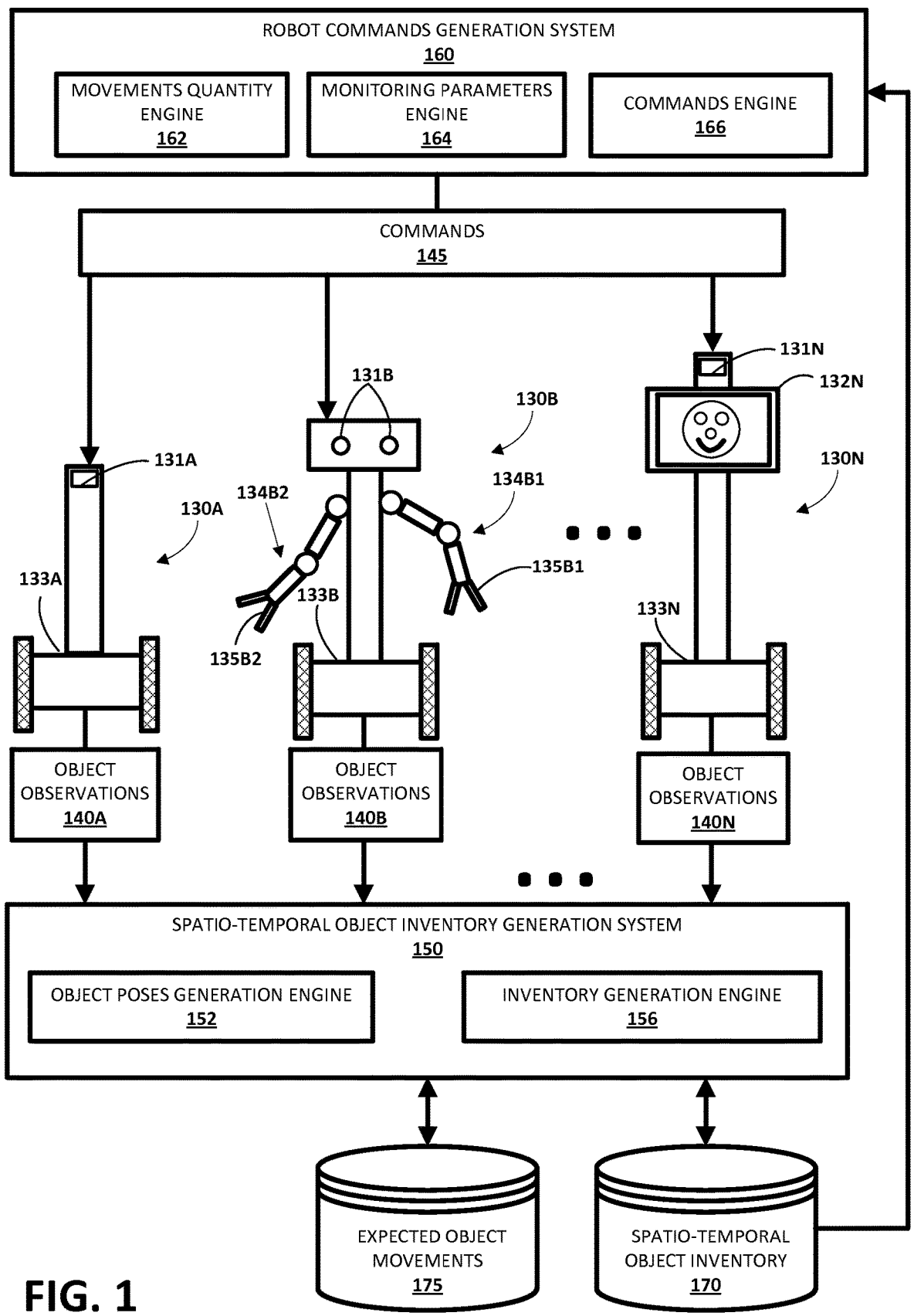
FIG. 1 illustrates an example environment in which a spatio-temporal object inventory may be generated based on object observations from mobile robots and/or monitoring parameters for the mobile robots for one or more future time periods may be determined based on the spatio-temporal object inventory.

FIG. 1 illustrates an example environment in which a spatio-temporal object inventory 170 may be generated based on object observations 140A-N from mobile robots 130A-N and/or in which monitoring parameters for the mobile robots 130A-N for one or more future time periods may be determined based on the spatio-temporal object inventory 170. Three robots 130A, 130B, and 130N are illustrated in the example environment of FIG. 1. Additional robots may also be present as indicated by the ellipsis of FIG. 1 that is positioned between robot 130B and robot 130N. Also provided in the environment of FIG. 1 is a spatio-temporal object inventory generation system 150, a robot commands generation system 160, a spatio-temporal object inventory 170, an expected object movements database 175, and object observations 140A, 1406, and 140N. Various components of the environment may communicate with one another via one or more networks such as a local area network (LAN) and/or or a wide area network (WAN) such as the Internet. In other implementations, a direct connection between one or more components may be utilized.

The object observations 140A, 140B, and 140N may be provided to system 150 by corresponding robots 130A, 130B, and 130N to generate a spatio-temporal object inventory 170 according to techniques described herein. Moreover, robot commands generation system 160 may use the spatio-temporal object inventory 170 to determine a quantity of movements of objects that occur in one or more areas of an environment when one or more particular criteria are satisfied—and determine monitoring parameters based on that quantity that can be utilized to provide commands to one or more of the mobile robots that influence one or more aspects of movements of the mobile robots at future time periods when the one or more particular criteria are also satisfied Each of the robots 130A-N may be located in an environment such as a building (e.g., a warehouse, a manufacturing facility, an office building), one or more buildings of a collection of nearby buildings, one or more floors of a multi-floor office or other building, etc. Additional and/or alternative robots may be provided in other implementations, such as additional robots that vary in one or more respects from those illustrated in FIG. 1. For example, autonomous or semi-autonomous forklift robots may be provided as the only robots and/or with other robots.

Each of the robots 130A, 130B, and 130N includes a corresponding base 133A, 133B, and 133N with wheels provided on opposed sides thereof for locomotion of a corresponding of the robots 130A, 130B, and 130N. Each of the bases 133A, 133B, and 133N may include, for example, one or more motors for driving corresponding wheels to achieve a desired direction, velocity, and/or acceleration of movement for the corresponding robot 130A, 130B, and 130N.

Each of the robots 130A, 130B, and 130N also includes at least one pose device that includes one or more corresponding pose sensors. As used herein, a pose sensor is a sensor that can sense data related to shape, color, radio frequency, and/or other features of an object that is in the line of sight (or other sensing range) of the sensor, wherein the sensed data can be used (optionally in combination with other data) to determine a location and/or orientation of the object. As one example of a pose device, the robots 130A and 130 N include corresponding 3D laser scanners 131A and 131N that each include one or more lasers that emit light and one or more sensors that collect data related to reflections of the emitted light to enable determination of location and/or orientation of various objects. The laser scanners 131A and 131N may be, for example, time-of-flight 3D laser scanners or triangulation based 3D laser scanners and may include a position sensitive detector (PSD) or other optical position sensor.

As another example of a pose device, the robot 130B includes a stereo camera 131B that includes two sensors (e.g., charge-coupled devices (CCDs)), each at a different vantage point. By comparing data sensed by the two sensors at different vantage points, position and/or orientation of various objects may be determined. As yet another example of a pose device, a robot may include a machine vision camera that includes a sensor that captures data related to, inter alia, fiducial tags on objects. Data related to a fiducial tag on an object can be utilized to detect the fiducial tag and determine position and/or orientation of the object based on the fiducial tag. As yet another example of a pose device, a robot may include radio-frequency identification (RFID) reader that reads an RFID tag (passive or active) of an object, and the robot may use its own pose at the time of reading the RFID tag to determine the position of the object. Although specific examples of pose devices and associated sensors are described herein, additional and/or alternative pose devices and associated sensors may be utilized.

Each of the robots 130A, 130B, and 130N also includes one or more controllers that, for example, provide control commands to actuators and/or other operational components thereof, generate all or aspects of object observations described herein, and/or receive one or more commands 145 provided by robot commands generation system 160 and generate one or more control commands that are based on the commands 145. For example, one or more controllers of robot 130A may provide control commands to servo motors that drive the wheels of the robot 130A to navigate the robot 130A to various locations in the environment autonomously, where those control commands are generated by the robot 130A in view of the commands 145 received from system 160. Also, for example, one or more controllers of robot 130A may establish a network connection with spatio-temporal object inventory generation system 150 and/or robot commands generation system 160 via a network interface of the robot 130A, and provide all or aspects of object observations 140A to the system 150 and/or receive commands 145 from robot commands generation system 160. Additional description of some examples of the structure and functionality of various robots is provided herein.

The robot 130A may be a monitoring/observation robot that moves around an environment and collects data via the 3D laser scanner 131A and/or other sensors, but that doesn't perform any additional non-monitoring/observation tasks. The robot 130B includes robot arms 134B1 and 134B2 with corresponding end effectors 135B1 and 135B2, that each take the form of a gripper with two opposing "fingers" or "digits." The robot arms 134B1, 134B2 and end effectors 135B1, 135B2 may be controlled autonomously, semi-autonomously, and/or based on control commands provided by a user via a computing device of a user. For example, the robot arm 134B1 may be autonomously controlled to position the end effector 135B1 proximal to an object and the end effector 135B1 may be autonomously controlled to grasp the object. The robot 130N is a telepresence robot that includes a display screen 132N and may provide mobile videoconferencing among other functionalities. For example, the robot 130N may be utilized to enable a user at a remote computing device to receive a "live view" from the robot 130N (e.g., via an additional camera of the robot 130N) and/or to display some indicia of the user on the display screen 132N. The indicia of the user may be, for example, an image of the user, a live video feed from a camera coupled to the user's computing device, etc. Although a heterogeneous group of robots is illustrated in FIG. 1, robots in an environment may be homogenous in other implementations.

The robots 130A-N provide corresponding object observations 140A-N to the spatio-temporal object inventory generation system 150 and the spatio-temporal object inventory generation system 150 generates the spatio-temporal object inventory 170 based on the provided object observations. Generating the spatio-temporal object inventory 170 may include updating the inventory 170 to reflect changes in the environment indicated by the object observations such as the movement of objects in the environment, the introduction of new objects to the environment, or the removal of objects from the environment. The spatio-temporal object inventory generation system 150 may update the inventory 170 continuously, periodically, based on receipt of one or more new object observations, and/or based on other criteria.

The robots 130A-N may provide object observations 140A-N under various circumstances. For example, the robots 130A-N may provide the object observations 140A-N when they are already engaged in another task (e.g., robot 130B may provide a plurality of the object observations 140B as it is navigating to a location to perform a task) and/or when they are not engaged in another non-monitoring/observation task (e.g., instead of sitting idle, a robot may move throughout the environment to provide object observations). As understood in view of the description herein, robots 130A, 130B, 130N will typically provide a plurality of object observations over a period of time. For example, the object observations 140A of robot 130A include a plurality of object observations, with each of the object observations being for a different moment in time.

Each of the object observations 140A-N may each include, inter alia: at least one object identifier of an object, a measured object pose for the object, and a measurement time for the measured object pose. The object identifier of a measured object may be, for example based on a fiducial tag on the object, a radio-frequency identification (RFID) tag (passive or active) of the object, and/or feature points of the object, and may be determined by a corresponding one of the robots 130A-N based on various techniques. For example, when the object identifier is based on a fiducial tag on the object (e.g., a QUICK RESPONSE (QR) code or other barcode, an alphanumeric tag), robot 130A may determine the object identifier of a measured object based on extracting the object identifier from the fiducial tag in an image of the object captured by the robot 130A. Also, for example, when the object identifier is based on a RFID tag of the object, robot 130A may include a RFID reader that reads the RFID tag and an ID signal of the read RFID tag utilized as the object identifier. Also, for example, when the object identifier is based on feature points of the object, robot 130A may utilize the laser scanner 131A, a camera, and/or other sensor to generate the feature points and determine the identifier based on those feature points.

In some implementations, the measured object pose for the object may be determined by a corresponding one of the robots 130A-N based on data sensed by one or more sensors of a corresponding one of pose devices 131A-N. The measured object pose for the object may be provided as a single pose, such as a single mean pose in the SE(3) configuration space—or may be provided as a pose with a covariance measure, such as a mean pose in the SE(3) configuration space with an associated Gaussian covariance measure within the 6-dimensional tangent space around the mean.

The measurement time indicates a time at which the sensor data on which the measured object pose is based was sensed. The measurement time may be based on the time at which the sensor data was sensed, or may be based on another event such as the time at which the measured object pose was determined (when it differs from the sensor data). In some implementations, one or more (e.g., all) of the object observations 140A-N may omit the measurement time and the measurement time may be inferred by the spatio-temporal object inventory generation system 150 based on a time of receipt of the corresponding object observations 140A-N.

In some implementations, one or more of the object observations 140A-N may also include a measured source pose for the one or more sensors utilized to generate the corresponding measured object pose at the measurement time. In other words, the measured source pose of an object observation indicates the pose of the corresponding robot and/or the corresponding sensor of the robot when the measurement for the measured object pose was taken. The measured source pose may be provided as a single pose, such as a single mean pose in the SE(3) configuration space—or may be provided as a pose with a covariance measure, such as a mean pose in the SE(3) configuration space with an associated Gaussian covariance measure within the 6-dimensional tangent space around the mean.

As described herein, in some implementations the spatio-temporal object inventory generation system 150 may determine an object pose for the spatio-temporal object inventory 170 based on both a corresponding measured object pose and a corresponding measured source pose. In some implementations, the system 150 may determine an object pose for the spatio-temporal object inventory 170 based on a corresponding measured object pose and without reference to a corresponding measured source pose. In some of those implementations, the measured source pose may be provided to the system 150 as the measured object pose.

In some implementations, the measured source pose for the object may be determined by a corresponding one of the robots 130A-N based on data sensed by one or more sensors thereof. Various localization techniques may be utilized by the robots 130A-N to determine a measured source pose such as particle filters, landmark detection, and/or GPS. In some implementations, one or more sensors external to a robot may be utilized to determine the measured source pose for the robot. For example, a measurement from a stationary camera viewing the robot may be utilized to determine the measured source pose for the robot. The measurement may be correlated to the robot based on, for example, a fiducial marker and/or RFID tag of the robot and the measurement may be timestamped to correlate the measurement to a corresponding measurement time of an object observation. As another example, a measurement from another robot viewing a given robot may be utilized to determine the measured source pose for the given robot. The measurement may be correlated to the robot based on, for example, a fiducial marker and/or RFID tag of the robot and the measurement may be timestamped to correlate the measurement to a corresponding measurement time of an object observation. In some implementations, a measurement from another robot viewing a given robot may be utilized to determine the measured source pose for the given robot when the given robot does not itself provide a measured source pose (e.g., the given robot lacks an appropriate sensor or includes an appropriate sensor but is unable to localize). It is noted that the measurement from another robot utilized to determine the measured source pose for a given robot may be a measured object pose from the other robot, where the object of the measured object pose is the given robot. A measurement from one or more sensors external to the robot may be utilized as the sole source for a measured source pose of the robot and/or combined with measurements from other sensors (of the robot or external to the robot) to determine the measured source pose of the robot.

Spatio-temporal object inventory generation system 150 may include one or computing systems connected by one or more networks (not depicted) and may use object observations 140A-N to generate spatio-temporal object inventory 170 that defines objects, object poses, and corresponding measurement times for multiple objects in the environment accessible by the robots 130A-N. An example of such a computing system is depicted schematically in FIG. 7. Various modules or engines may be implemented as part of spatio-temporal object inventory generation system 150 as software, hardware, or any combination of the two. For example, in FIG. 1 system 150 includes an object poses generation engine 152 and an inventory generation engine 154. Although examples below are discussed with respect to object observations 140A-N for robots 130A-N, in some implementations the spatio-temporal object inventory generation system 150 may also use object observations for fixed sensors not mounted on robots to determine at least some of the object poses and corresponding measurement times for one or more of the objects in the environment.

The object poses generation engine 152 is configured to determine, for each of the object observations 140A-N, a pose for the object indicated by the observation for the measurement time indicated by the observation. The object poses determined by the object poses generation engine 152 are with respect to a reference frame, such as a so called "world frame."

In some implementations, the measured object poses of one or more of object observations 140A-N may be provided with respect to the reference frame. For example, a measured object pose provided by the robot 130A may be one that is in the reference frame as a result of robot 130A having modified the measured object pose in view of a corresponding measured source pose. As another example, in some implementations the measured object pose of robot 130B may be a measured source pose of robot 130B that is already in the reference frame. For instance, the robot 130B may determine an object identifier of an object based on an RFID tag of the object and/or a fiducial tag of the object and the robot 130B may provide its own source pose as the measured object pose for the object at that time.

In some implementations, the measured object poses of one or more of object observations 140A-N may be with respect to a sensor utilized to determine the measured object pose and those object observations may also be provided with a measured source pose that is with respect to the reference frame. In those implementations, the object poses generation engine 152 may determine an object pose in the reference frame based on modifying the measured object pose in view of the measured source pose. In other words, the object poses generation engine 152 may use the measured source pose to transform the measured object pose into the reference frame.

The inventory generation engine 154 stores the pose values determined by the object poses generation engine 152 in the spatio-temporal object inventory 170, along with the corresponding object identifiers of the pose values and the corresponding measurement times of the pose values. Accordingly, the generated inventory 170 may define, for each of a plurality of objects, a plurality of object poses and associated measurement times for the object poses. Notably, each of the determined and stored object poses is from a different object observation of the object observations 140A-N and the object observations 140A-N are from a plurality of corresponding robots 130A-N.

In some implementations, when a newly received object observation includes a measured object pose for an object that doesn't vary by at least a threshold amount from a most recent object pose for the object that was most recently stored by the inventory generation engine 154, the engine 154 may not store an additional object pose based on the newly received object observation. In some of those implementations, the engine 154 may instead associate a measurement time of the newly received object observation with the most recent object pose. In some implementations, the engine 156 may combine (e.g., average) the most recent object pose and an additional object pose determined based on the newly received object observation, and replace the most recent object pose with the combined object pose.

In some implementations, the inventory generation engine 154 may define one or more of the object poses for objects in the spatio-temporal object inventory 170 as an indication that the object is no longer present in the environment (i.e., indicating a position outside of the environment) and/or its location is unknown (i.e., indicating an unknown position). In some implementations, the inventory generation engine 154 determines an object is no longer present in the environment based on, for example, not receiving an object observation that identifies the object for at least a threshold amount of time. In some implementations, the inventory generation engine 154 determines an object is no longer present in the environment based on identifying an entry is present for the object in expected object movements database 175 (optionally in combination with not receiving an object observation that identifies the object for at least a threshold amount of time). Expected object movements database 175 may include, for each of one or more objects, data indicating the object is expected to move out of the environment. Data indicating the object is expected to be moved out of the environment may be based on, for example, a received order for the object, a request to move the object, and/or recorded actions of one or more robots that relate to moving the object.

In some implementations, the inventory generation engine 154 determines an object's position is unknown based on, for example, receiving one or more object observations for other objects at or near a last known pose of the object, but not receiving an object observation for the object. In some of those implementations, the inventory generation engine 154 determines an object's position is unknown further based on identifying an entry is not present for the object in expected object movements database 175 (otherwise, if it was present the object's position may be known as "outside of the environment"). In some implementations, the inventory generation engine 154 determines an object's position is unknown based on, for example, directing one or more of the mobile robots 130A-N to direct a pose device thereof specifically toward the last known pose of the object. If the one or more directed mobile robots do not detect the object at or near the last known pose, the inventory generation engine 154 may determine the object's position is unknown. In some of those implementations, the engine 154 may direct one or more of the mobile robots 130A-N to the object based on, for example, not receiving an object observation that identifies the object for at least a threshold amount of time. In some implementations, the threshold amount of time and/or whether the engine 154 directs one or more of the mobile robots to the object may be based on, for example, a level of importance of the object.

The values and relationships of the spatio-temporal object inventory 170 may be stored in the inventory 170 in various manners. For example, the spatio-temporal object inventory 170 may be an index with object identifiers being index values that each point to tuples that each include at least: an object pose value for one or more corresponding times and the one or more corresponding times. Also, for example, the spatio-temporal object inventory 170 may have a graph topology with the object identifiers being nodes and the nodes each connected to a central node by one or more edges. Each of the edges may be based on one or more object observations and may include attributes such as an object pose value for one or more corresponding times and the one or more corresponding times. For instance, a given node may have a plurality of edges, with each of the edges being based on a corresponding object observation. As yet another example, the spatio-temporal object inventory 170 may have a graph topology with object identifiers being nodes and the object poses also being nodes. The object identifier nodes may each be connected to one or more object pose nodes by one or more edges, wherein each edge is based on an object observation for the corresponding object identifier that indicated the corresponding object pose. For example, a given edge may be between a given object identifier node and a given object pose node and may be based on a corresponding object observation. The given edge may include attributes such as a corresponding measurement time.

In some implementations, the spatio-temporal object inventory 170 may be utilized to improve data quality in expected object movements database 175 and/or other database(s) of one or more inventory management systems. For example, the poses defined for objects in inventory 170 may be utilized to verify poses of those objects that are expected by the inventory management systems. For example, the inventory 170 may be utilized to verify that an object that should be in an environment is actually in the environment, to verify that the anticipated pose of the object in the environment is as expected, and/or to verify that an object that should have left the environment actually left the environment. As described below, robot commands generation system 160 may employ various techniques to distribute mobile robots 130A-N throughout an environment that may improve the accuracy and/or timeliness of the inventory 170 (and/or improve the efficiency of utilization of mobile robots 130A-N). This may make the inventory 170 more effective in verifying poses that are expected by the inventory management systems and/or more effective for other purposes.

Robot commands generation system 160 may include one or computing systems connected by one or more networks (not depicted) and uses spatio-temporal object inventory 170 to determine monitoring parameters for the mobile robots 130A-N for one or more areas of the environment at one or more future time periods. Further, system 160 may provide commands 145 to one or more of the mobile robots 130A-N for influencing, in view of the monitoring parameters, the quantity of object observations at the one or more areas of the environment at the future time periods. Various modules or engines may be implemented as part of robot commands generation system 160 as software, hardware, or any combination of the two. For example, in FIG. 1 system 160 includes a movements quantity engine 162, a monitoring parameters engine 164, and a commands engine 166.

Movements quantity engine 162 determines a quantity of movements of objects of the spatio-temporal object inventory 170 that occurred in at least one area of the environment when one or more criteria were satisfied. The criteria may include, for example, one or more of: one or more particular temporal periods, presence of a particular group of one or more humans in the area, presence of one or more particular quantities of humans in the area, and/or inventory criteria.

In some implementations, the movements quantity engine 162 may determine an unweighted quantity of movements (i.e., each movement is counted the same). In some other implementations, the movements quantity engine 162 may, in determining the quantity, weight one or more of the movements based on various criteria. For example, the engine 162 may weight one or more of the movements based on temporal proximity to a current time (e.g., those that are more proximal may be weighted more heavily). Also, for example, the engine 162 may weight one or more of the movements based on a level of importance for the object identifiers associated with the movements. For instance, some object identifiers associated with high value objects may have a higher level of importance than lower value objects and/or some object identifiers associated with objects that need to be in certain environmental conditions (e.g., within certain temperatures) may have a higher level of importance than those items that do not. Also, for example, the engine 162 may weight one or more of the movements based on whether the movements were "expected movements" or "unknown movements" (e.g., as described above). For example, "unknown" movements may be weighted more heavily to increase the focus on the "unknown movements" (e.g., those movements that are determined based on object poses that indicate an object's location is unknown).

In some implementations, the movements quantity engine 162 may restrict those movements for which it determines a quantity based on various criteria. For example, the movements of the objects that are used by movements quantity engine 162 to determine a quantity of movements in an area may be restricted to movements that are "unknown movements." Also, for example, the movements of the objects that are used by movements quantity engine 162 to determine a quantity of movements in an area may be restricted to movements that are associated with objects that have at least a threshold level of importance. As yet another example, the movements of the objects that are used by movements quantity engine 162 to determine a quantity of movements in an area may be restricted to movements that are "unknown movements" and that are associated with objects that have at least a threshold level of importance.

In implementations where the criteria include a particular temporal period, the particular temporal period may be, for example, one or more particular days of the week, one or more particular days of the year, or one or more time periods during one or more particular days of the week or particular days of the year. In implementations where the criteria include a particular temporal period, the movements of the objects that are used to determine a quantity of movements in an area may be restricted at least to those movements that occurred during the particular temporal period. Such movements may be determined by the movements quantity engine 162 based on, for example, determining the pose values that indicate those movements have measurement times defined in the inventory 170 that indicate movement in the area during the temporal period.

For example, the movements quantity engine 162 may determine that a movement of one of the objects into the area occurred during the particular temporal period based on determining that a first pose for the object in inventory 170 is outside of the area and has a first corresponding measurement time that is temporally before the temporal period, and determining that a second pose for the object in inventory 170 is within the area and has a second corresponding measurement time that is temporally within the temporal period. Also, for example, the movements quantity engine 162 may determine that a movement of one of the objects into the area occurred during the particular temporal period based on determining that no pose that is temporally before the temporal period is defined for the object in the inventory 170 and determining that a pose for the object in inventory 170 is within the area and has a corresponding measurement time that is temporally within the time period. As yet another example, the movements quantity engine 162 may determine that a movement of one of the objects out of the area occurred during the particular temporal period based on determining that a first pose for the object in the inventory 170 is inside the area and has a first corresponding measurement time that is temporally before the time period, and determining that a second pose for the object in the inventory 170 is outside of the area and has a second corresponding measurement time that is temporally within the temporal period.

In some implementations where the criteria include presence of a group of one or more humans in the area, the group may be, for example, one or more particular humans and/or "classes" of humans. For example, the group may include one or more of: a particular employee, a plurality of particular employees, one or more particular contractors, one or more contractors in general, and/or one or more guests in general.

In some implementations where the criteria include presence of a group of one or more humans in the area, the movements of the objects that are used to determine a quantity of movements in an area may be restricted at least to those movements that occurred when the group of one or more humans was present. The movements quantity engine 162 may determine such movements based on, for example, receiving human presence data that indicates a plurality of temporal periods when the group of one or more humans were present in the area, and determining, based on the inventory 170, the pose values that indicate those movements and that have measurement times that are during one of the temporal periods when the group of one or more humans was present. In some implementations, the human presence data may be based on identifiers provided by one or more electronic access control systems, such as identifiers provided by access control systems in response to humans "badging in/out" and/or using biometric features to gain access to the area. In some implementations, the human presence data may be provided by the mobile robots 130A-N, fixed camera systems, and/or other sensors of the environment. For example, the human presence data may be determined by the mobile robots 130A-N based on identifiers sensed from "RFID tags" in badges worn by the humans and/or determined based on image analysis.

In some implementations where the criteria include presence of a group of one or more humans in the area, techniques described herein may promote extra monitoring of inventory by mobile robots in one or more areas where humans are present that are associated with a relatively large amount of object movements. For example, when a first group that frequently moves objects is present in an area, inventory monitoring by the robots 130A-N may be increased relative to when a second group that rarely moves objects is present in the area. For instance, the first group may be workers whose job is to retrieve objects for transporting the objects to another area and/or out of the environment and the second group may be workers whose job is to repair mechanical equipment (and that rarely move objects). In some of those and/or other implementations, the movements of the objects that are used by movements quantity engine 162 to determine a quantity of movements in an area may be restricted to movements that are out of the area and that are "unknown movements", such as movements of objects that are determined based on object poses that indicate an object's location is unknown. This may enable determining a quantity of unexpected movements that occurred when one or more criteria were satisfied and may, when the quantity is relatively high, further enable monitoring of inventory by one or more mobile robots to be increased for future time periods that satisfy the criteria.

In some implementations where the criteria include one or more particular quantities of one or more humans are present in the area, the particular quantities may be, for example, a single quantity such as "5", or one or more ranges of quantities such as "5-10"; or "2-4 and 6-10". In some implementations, the movements of the objects that are used to determine a quantity of movements in an area may be restricted at least to those movements that occurred when the particular quantities were present in the area. The movements quantity engine 162 may determine such movements based on, for example, receiving human presence data indicating a plurality of temporal periods when the particular quantities one or more humans were present in the area (e.g., received from "badge ins", received from "RFID tags", determined by image analysis) and determining, based on the inventory 170, that the pose values that indicate those movements have measurement times that are during one of the temporal periods when the particular quantities were present in the area.

In implementations where the criteria include inventory criteria of the environment, the inventory criteria may be, for example, the presence of at least a threshold quantity of one or more particular types of inventory and/or inventory in general, the presence of less than a threshold quantity of one or more particular types of inventory and/or inventory in general, and/or at least a threshold change in the quantity of one or more particular types of inventory and/or inventory in general. In some implementations, the inventory criteria of the environment is inventory criteria restricted to the area of the environment for which the quantity of movements of the objects is being determined.

In some implementations, the movements of the objects that are used to determine a quantity of movements in an area may be restricted at least to those movements that occurred when the particular inventory criteria was present. The movements quantity engine 162 may determine such movements based on, for example, determining, based on the spatio-temporal object inventory 170, temporal periods when the particular inventory criteria was present in the area and determining the object poses that indicate those movements have measurement times defined in the inventory 170 that are during one of the temporal periods when the particular inventory criteria was present in the area.

Although several examples are provided above that rely on only a single criterion, it is understood that the movements quantity engine 162 may determine a quantity of movements that occurred in an area when a plurality of criteria were satisfied. For example, engine 162 may determine a quantity of movements that occurred in an area on any weekday for the last month when at least 5 humans were present and at least 100 quantities of objects of "type A" were present. Also, although several examples are provided above that describe only determining a single quantity for one or more areas based on a set of one or more criteria, it is understood that movements quantity engine 162 may determine a corresponding quantity for each of multiple instances, with each instance being for a different area and/or a different set of criteria. For example, a first quantity can be determined for a first area of an environment for a first set of criteria and a second quantity can be determined for a second area of the environment for a second set of criteria. Also, for example, a third quantity can be determined for the first area of the environment for a second set of criteria.

For each of the quantities determined by engine 162, monitoring parameters engine 164 determines one or more monitoring parameters for the corresponding area(s) at one or more future time periods when the corresponding criteria are also satisfied. The monitoring parameters engine 164 may store determined monitoring parameters with associated area(s) and with associated criteria for utilization by commands engine 166 as described herein. The monitoring parameters generally define how many of the mobile robots 130A-N should be deployed to the area and/or a how often one or more of the mobile robots 130A-N should encounter the area. For example, assume that for a first area of the environment and for a first set of one or more criteria, a quantity of movements determined by engine 162 is 10. Further assume that for a second area of the environment and for the first set of criteria, a quantity of movements determined by engine 162 is 250. The monitoring parameters engine 164 will determine monitoring parameters for the second area for the first set of criteria that define a larger number of mobile robots should be deployed and/or should be deployed with a greater frequency than the number and/or frequency that it determines for the first area for the first set of criteria.

In some implementations, determining the monitoring parameters based on the quantity of the movements that occurred in an area when certain criteria were satisfied includes determining the monitoring parameters based on the raw quantity determined by engine 162. For example, first monitoring parameters may be determined if the raw quantity is less than 50, second monitoring parameters may be determined if the raw quantity is from 50 to 100, etc. In some implementations, determining the monitoring parameters based on the quantity of the movements that occurred in an area when certain criteria were satisfied includes determining the quantity based on a normalization of the quantity determined by engine 162, or based on some other transformation of the quantity. For example, in some implementations a raw quantity determined by engine 162 may be normalized with respect to one or more values such as the number of days, hours, and/or weeks represented by the raw quantity of movements. For example, if the quantity is based on a quantity of movements that occurred in an area over the last day, the quantity may be normalized to an average quantity of movements per hour (e.g., the raw quantity divided by 24). As another example, if the quantity is based on a quantity of movements that occurred in an area over the last hour, the quantity may be normalized to an average quantity of movements per minute (e.g., the raw quantity divided by 60). As yet another example, if the quantity is a quantity of movements that occurred on Tuesdays for the past 52 weeks, the quantity may be normalized to an average quantity of movements per day (e.g., the raw quantity divided by 52).

As one particular example, all quantities determined by engine 162 may be normalized to an average quantity of movements per minute. The monitoring parameters engine 164 may determine first monitoring parameters if the average quantity of movements per minute is less than 1, determine second monitoring parameters if the average quantity of movements per minute is from 1 to 5, determine third monitoring parameters if the average quantity of movements per minute is from 6 to 10, etc. The third monitoring parameters may define a greater quantity of mobile robots in an area and/or a greater frequency of robot movements in the area than the second monitoring parameters, and the second monitoring parameters may define a greater quantity and/or greater frequency than the first monitoring parameters.

As described herein, the monitoring parameters engine 164 may determine multiple instances of monitoring parameters, with each of the instances being associated with one or more corresponding areas of the environment and one or more corresponding criteria. For each of one or more instances of the monitoring parameters, commands engine 166 provides, to the mobile robots 130A-N, commands 145 that are based on those monitoring parameters and that will influence one or more aspects of the movement of mobile robots 130A-N at future time periods when the criteria corresponding to those monitoring parameters are satisfied. As a result of the influence of one or more aspects of the movement of mobile robots 130A-N at future time periods, the provided commands 145 will influence, during those future time periods, the quantity of object observations at the one or more areas corresponding to those monitoring parameters.

In some implementations, the commands 145 may explicitly direct a quantity of the mobile robots 130A-N to travel to the one or more areas for which the monitoring parameters have been determined, where the quantity is based on the monitoring parameters. For example, where the monitoring parameters define at least 5 mobile robots should be deployed, the commands may direct 5 of the mobile robots 130A-N to the one or more areas and/or direct as many of the mobile robots 130A-N that are available, up to 5, to the one or more areas.

In some implementations, the commands 145 may affect the likelihood that the mobile robots 130A-N will select a path that encounters the area during the future time periods. For example, the commands 145 may either increase or decrease the likelihood that one or more of the mobile robots 130A-N will "divert" off a "shortest" or otherwise "optimal" path to a location to visit the area during the time period (e.g., may increase and/or decrease the distance the one or more mobile robots 130A-N will divert). For example, where the monitoring parameters define that robots should be deployed to the area at a relatively high frequency, the commands 145 may direct the mobile robots 130A-N to divert up to 100 yards off of an optimal path if doing so would lead the robots 130A-N through the area. On the other hand, where the monitoring parameters define that robots should be deployed to the area at a relatively low frequency, the commands 145 may direct the mobile robots 130A-N to divert up to 15 yards off of an optimal path if doing so would lead the robots 130A-N through the area.

In some implementations, the commands engine 166 monitors for the satisfaction of any of the criteria for which monitoring parameters have been determined by monitoring parameters engine 164, and sends corresponding commands 145 to the mobile robots 130A-N in response to satisfaction of criteria for which an instance of monitoring parameters have been determined. For example, where the criteria consists of a particular temporal period (e.g., Tuesdays from 15:00-17:00), the commands engine 166 may monitor for occurrence of that particular temporal period (e.g., a Tuesday at any time within 15:00-17:00). In response to the occurrence, the commands engine may send commands 145 that are tailored based on the corresponding monitoring parameters. In some other implementations, the commands engine 166 may send commands 145 to the mobile robots 130A-N in advance of the occurrence, along with criteria that correspond to those commands. In those implementations, the robots 130A-N may themselves monitor for satisfaction of the criteria and operate according to the commands 145 in response to satisfaction of the criteria.

In some scenarios, the criteria for multiple instances of monitoring parameters may be satisfied during a given time period. For instance, assume a first instance of monitoring parameters may have associated criteria of "Tuesdays from 15:00-17:00" and a second instance of monitoring parameters have associated criteria of "group A of humans is present". Further assume that it is Tuesday at 15:00 and group A of humans is present in the environment. In some implementations, the commands engine 166 may generate commands 145 that are based on both the first instance of monitoring parameters and the second instance of monitoring parameters. In some other implementations, the commands engine 166 may generate commands 145 that are based on only one of the instances of monitoring parameters. For example, the commands engine 166 may generate the commands based on only the most recently determined instance of monitoring parameters. Also, for example, the commands engine 166 may generate the commands based on the instance of monitoring parameters that is associated with the most particularly defined criteria. For instance, first monitoring parameters with associated criteria of "Tuesdays from 13:00-15:00 with inventory X present" may be utilized over second monitoring parameters with associated criteria of "Tuesdays."

While robots 130A-N, system 150, and system 160 are depicted separately in FIG. 1, this is not meant to be limiting. In various implementations, one or more aspects of spatio-temporal object inventory generation system 150 may be implemented in robot commands generation system 160, or vice versa. Moreover, in various implementations, one or more aspects of system 150 and/or 160 may be implemented in on one or more of the robots 130A-N. For example, an instance of commands engine 166 may be implemented in each of the mobile robots 130A-N. In implementations where the robots 130A-N, system 150, and/or system 160 are separate components, they may communicate over one or more wired or wireless networks or using other wireless technology, such as radio, Bluetooth, infrared, etc.

Figure 2:
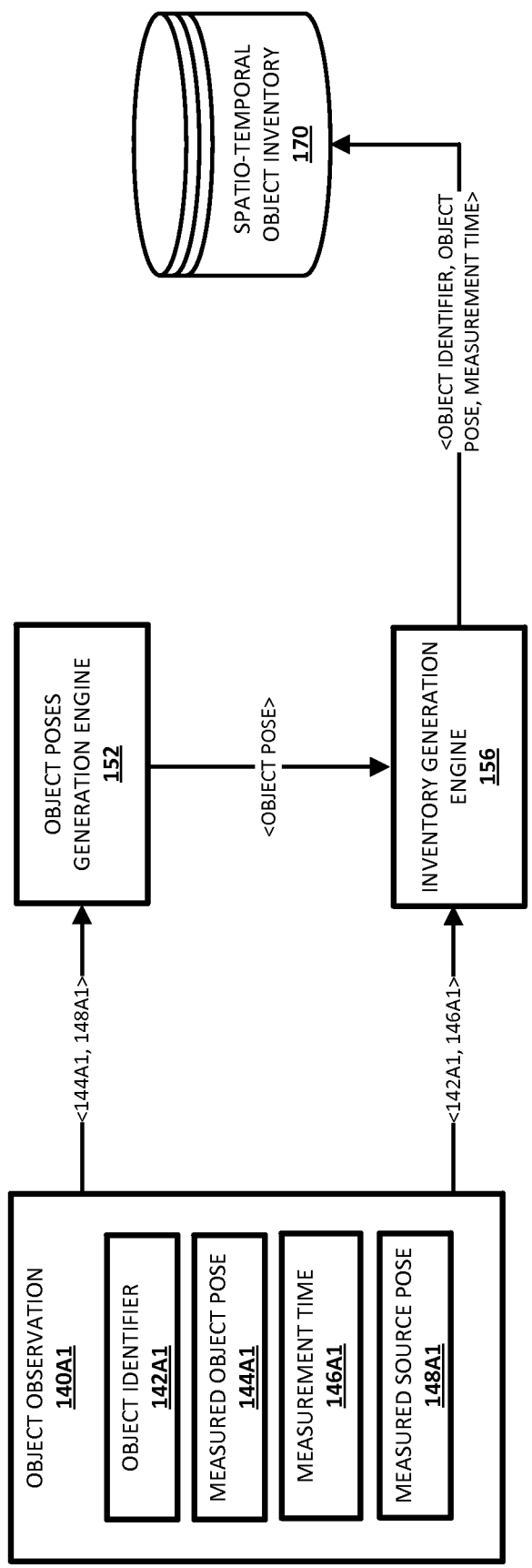
FIG. 2 illustrates an example of using an object observation of a mobile robot to generate a portion of a spatio-temporal object inventory.

FIG. 2 illustrates an example of using an object observation of a mobile robot to generate a portion of a spatio-temporal object inventory. In FIG. 2 an object observation 140A1 of object observations 140A (FIG. 1) is illustrated and includes an object identifier 142A1, a measured object pose 144A1, a measurement time 146A1, and a measured source pose 148A1.

The object poses generation engine 152 uses both the measured object pose 144A1 and the measured source pose 148A1 to determine an object pose. For example, the measured source pose 148A1 may be with respect to a reference frame and the measured object pose 144A1 may be with respect to a sensor whose measurement were utilized to determine the measured object pose 145A1, and the object poses generation engine 152 may use the measured source pose 148A1 to transform the measured object pose 144A1 into the reference frame. The object pose is provided to inventory generation engine 156.

The inventory generation engine 156 generates an entry for the spatio-temporal object inventory 170 that includes the the object identifier 142A1, the determined object pose, and the measurement time 146A1.

Although FIG. 2 is described with respect to a single object observation 140A1, it is understood that the technique of FIG. 2 may be utilized to generate additional portions of spatio-temporal object inventory 170 utilizing additional object observations 140A-N. Object observations 140A-N may be processed as they are received to keep the spatio-temporal object inventory 170 up to date.

Figure 3:
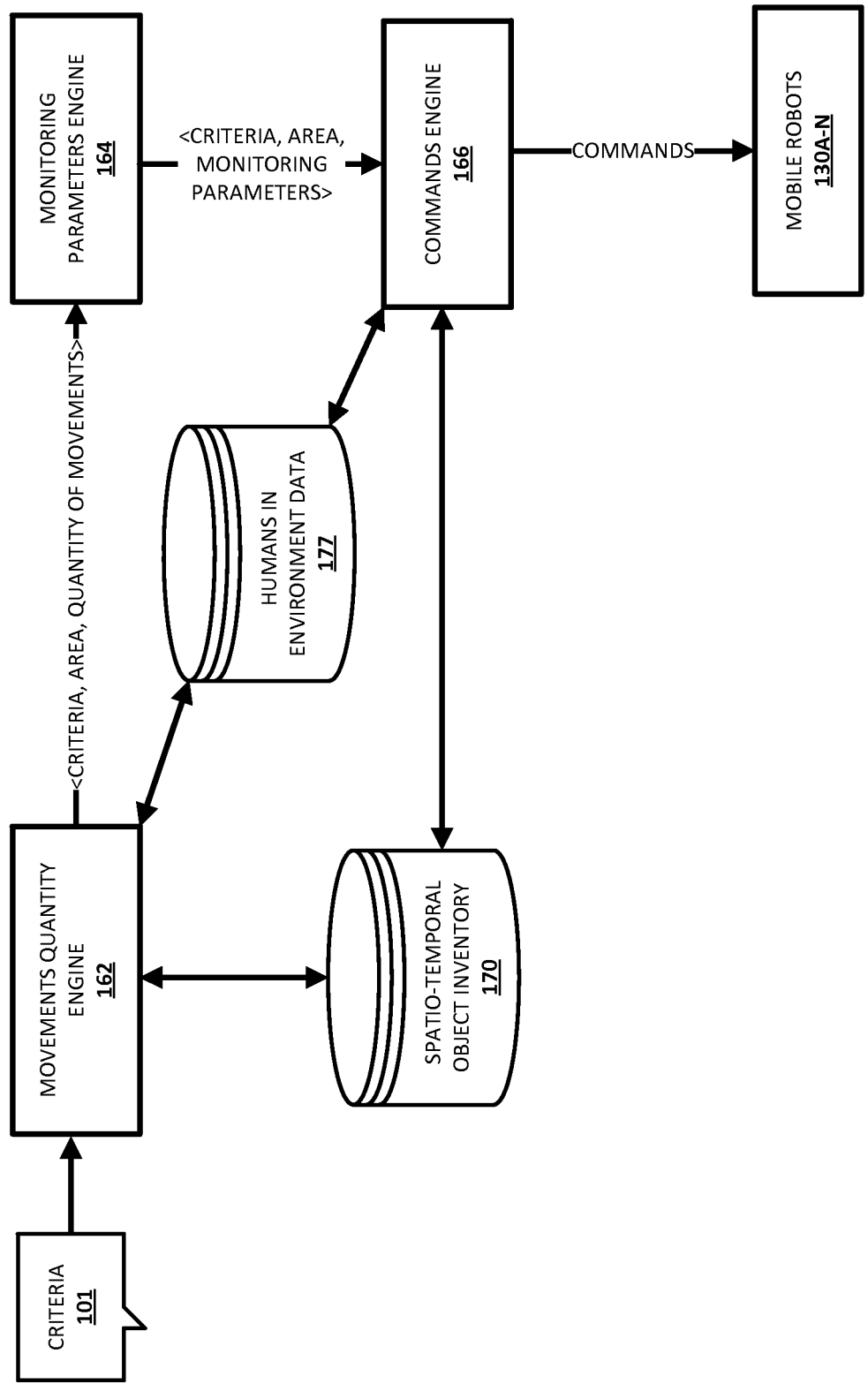
FIG. 3 illustrates an example of determining monitoring parameters for mobile robots based on a spatio-temporal object inventory and providing, to the mobile robots, commands that are based on the monitoring parameters.

FIG. 3 illustrates an example of determining monitoring parameters for mobile robots based on a spatio-temporal object inventory and providing, to the mobile robots, commands that are based on the monitoring parameters. In FIG. 3, criteria 101 are provided to movements quantity engine 162. As described herein, the criteria may include, for example, one or more of: one or more particular temporal periods, presence of a particular group of one or more humans in the area, presence of one or more particular quantities of humans in the area, and/or inventory criteria.

The movements quantity engine 162 determines, based on spatio-temporal object inventory 170 and/or humans in environment data database 177, a quantity of movements of objects defined in inventory 170 that occurred in an area of the environment when the criteria 101 were satisfied. The humans in environment data database 177 may include human presence data indicating, for each of a plurality of temporal periods, one or more humans present in an environment during those temporal periods and/or a quantity of humans present in the environment during those temporal periods. The movements quantity engine 162 may utilize database 177 to determine whether movements indicated in the inventory 170 satisfy "presence of a particular group of one or more humans in the area and/or presence of one or more particular quantities of humans in the area" criteria. The movements quantity engine 162 may rely on the inventory 170 to determine whether movements indicated in the inventory 170 satisfy "temporal periods and/or inventory" criteria.

The movements quantity engine 162 provides the determined quantity of movements and the area and criteria for the determined quantity of movements to the monitoring parameters engine 164. The monitoring parameters engine 164 determines, based on the received quantity of movements, one or more monitoring parameters for mobile robots for one or more future time periods when the criteria are also satisfied. For example, if the quantity of movements is relatively large, the engine 164 may determine monitoring parameters that indicate a relatively large number of mobile robots should be deployed to the area for one or more future time periods when the criteria are also satisfied and/or that mobile robots should encounter the area relatively frequently for one or more future time periods when the criteria are also satisfied.

The monitoring parameters engine 164 provides the determined monitoring parameters and the area and criteria to the commands engine 166. In the implementation of FIG. 3, the commands engine 166 monitors inventory 170 and/or database 177 for "current satisfaction" of the criteria provided by engine 164. In response to determining the current satisfaction, the commands engine 166 sends commands to the mobile robots 130A-N that are tailored based on the monitoring parameters. In some implementations, the commands engine 166 sends commands to the mobile robots 130A-N in advance of the current satisfaction. For example, the commands engine 166 may provide the commands in anticipation of a current satisfaction (e.g., 5 minutes before a temporal period criteria will be satisfied). In some implementations, the commands may explicitly direct a quantity of the mobile robots 130A-N to travel to the one or more areas for which the monitoring parameters have been determined, where the quantity is based on the monitoring parameters. In some implementations, the commands may affect the likelihood that the mobile robots 130A-N will select a path that encounters the area.

As one specific example, where the criteria consists of a particular temporal period and quantity of humans present in the environment (e.g., Tuesdays from 15:00-17:00 with at least 10 humans present), the commands engine 166 may monitor for occurrence of that particular temporal period (e.g., a Tuesday at any time within 15:00-17:00) and may access database 177 to monitor for occurrence of 10 humans being present in the environment. In response to the occurrence, the commands engine 166 sends commands to the mobile robots 130A-N that are tailored based on the monitoring parameters.

Figure 4A:
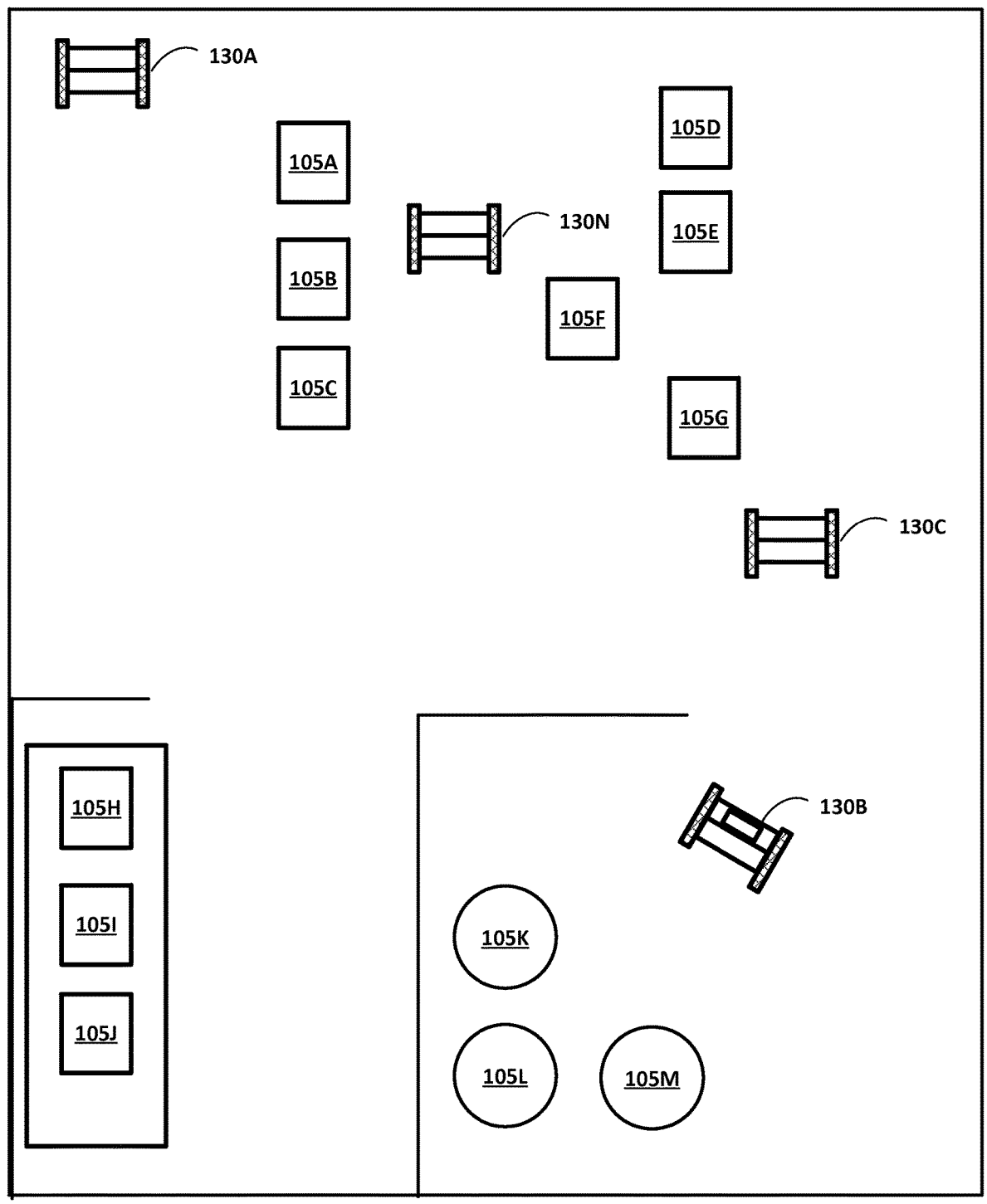
FIG. 4A illustrates a plan view of a portion of a building at a first time.
Figure 4B:
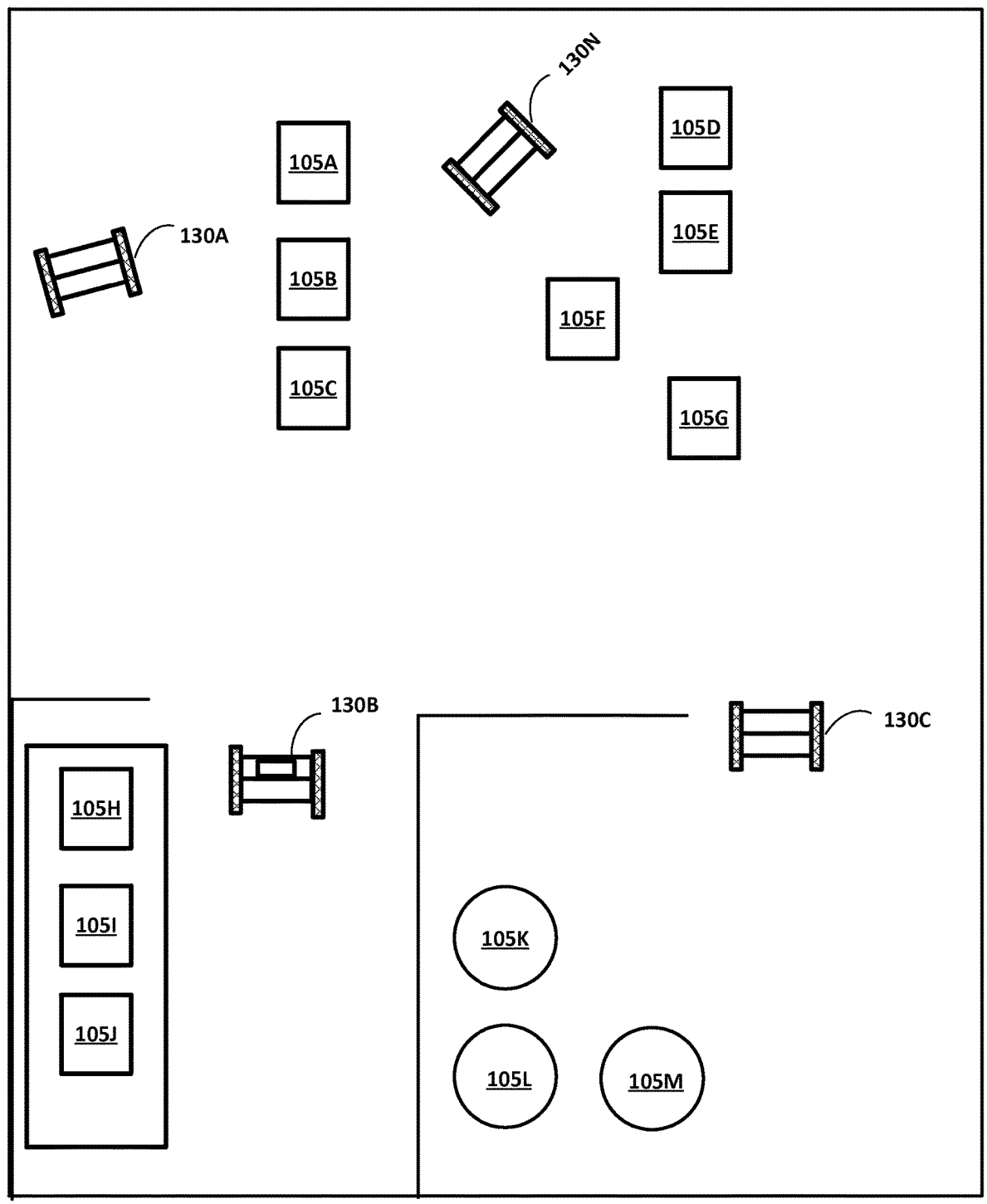
FIG. 4B illustrates the plan view of the portion of the building at a second time that is later than the first time of FIG. 4A.
Figure 4C:
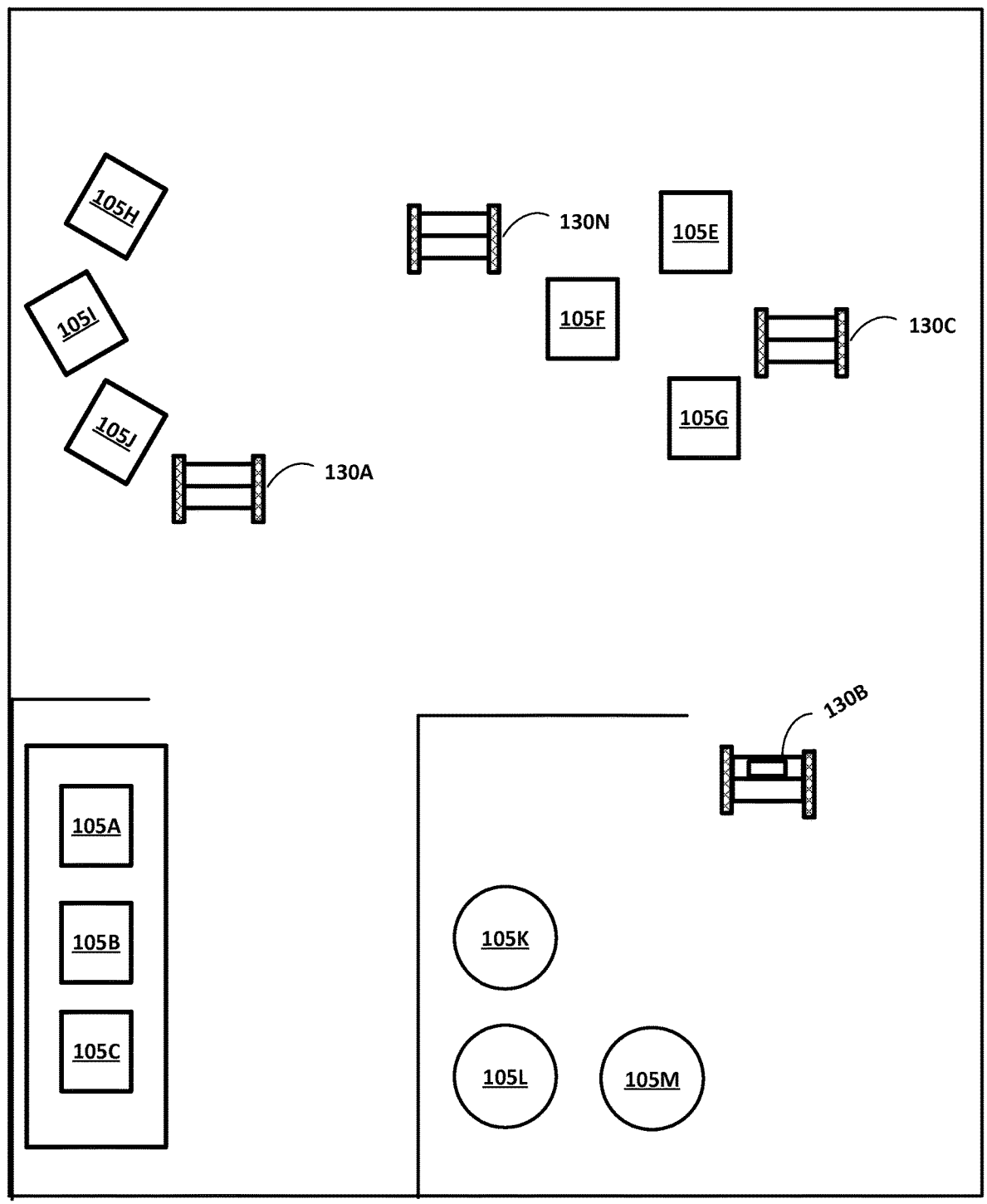
FIG. 4C illustrates the plan view of the portion of the building at a third time that is later than the second time of FIG. 4B.

With reference to FIGS. 4A-4C, examples are provided of robots 130A, 130B, 130C, and 130N moving through an environment and determining and providing object observations related to objects 105A-M in the environment. FIG. 4A illustrates a plan view of a portion of a building at a first time. At the first time objects 105A-M are illustrated in their respective positions and the robots 130A, 130B, 130C, and 130N are also illustrated in their respective positions. The objects 105A-H may be, for example, boxes, pallets, and/or other objects. The objects 105K-M may be, for example, drums, barrels, and/or other objects. At the first time of FIG. 4A, each of one or more of the robots 130A, 130B, 130C, and 130N may provide corresponding object observations for one or more of the objects 105A-M. For example, object 105A may be in the field of view of one or more sensors of robot 130A and robot 130A may provide an object observation with an object identifier of object 105A and a measured object pose for object 105A.

FIG. 4B illustrates the plan view of the portion of the building at a second time that is later than the first time of FIG. 4A. The objects 105A-M have the same poses in FIG. 4B as they do in FIG. 4A. However, the robots 130A, 130B, 130C, and 130N have all moved as the result of performing a task (an observation/monitoring task or non-observation/monitoring task). At the second time of FIG. 4B, each of one or more of the robots 130A, 130B, 130C, and 130N may provide corresponding object observations that include object observations with a measured object pose for one or more of the objects 105A-M. It is noted that multiple observations may have also been provided between the first time of FIG. 4A and the second time of FIG. 4B.

FIG. 4C illustrates the plan view of the portion of the building at a third time that is later than the second time of FIG. 4B. The objects 105K-M have the same poses in FIG. 4C as they do in FIGS. 4A and 4B. However, the objects 105A-C and 105E-M all have different poses as the result of movement by one or more humans, movement by one or more human controlled machines, and/or movement by one or more robots (that may include one or more of robots 130A, 130B, 130C, and 130N). The object 105D is no longer present in FIG. 4C due to movement of object 105D out of the environment. Moreover, the robots 130A, 130B, 130C, and 130N have all moved as the result of performing a task (an observation/monitoring task or non-observation/monitoring task). At the third time of FIG. 4C, each of one or more of the robots 130A, 130B, 130C, and 130N may provide corresponding object observations that include object observations with a measured object pose for one or more of the objects 105A-M. It is noted that multiple object observations may have also been provided between the second time of FIG. 4B and the second time of FIG. 4C.

The spatio-temporal object inventory 170 may be updated to reflect the changes in FIG. 4C according to techniques described herein. Moreover, commands generation system 160 may determine monitoring parameters in view of the movement of object 105D that occurred between FIG. 4B and FIG. 4C (and in view of other temporally distinct movements of objects), and utilize such monitoring parameters to provide control commands to the robots 130A, 130B, and 130N at a future time period, where the control commands are based on the monitoring parameters and influence one or more aspects of movements of the robots 130A, 130B, and 130N at the future time period.

Figure 5:
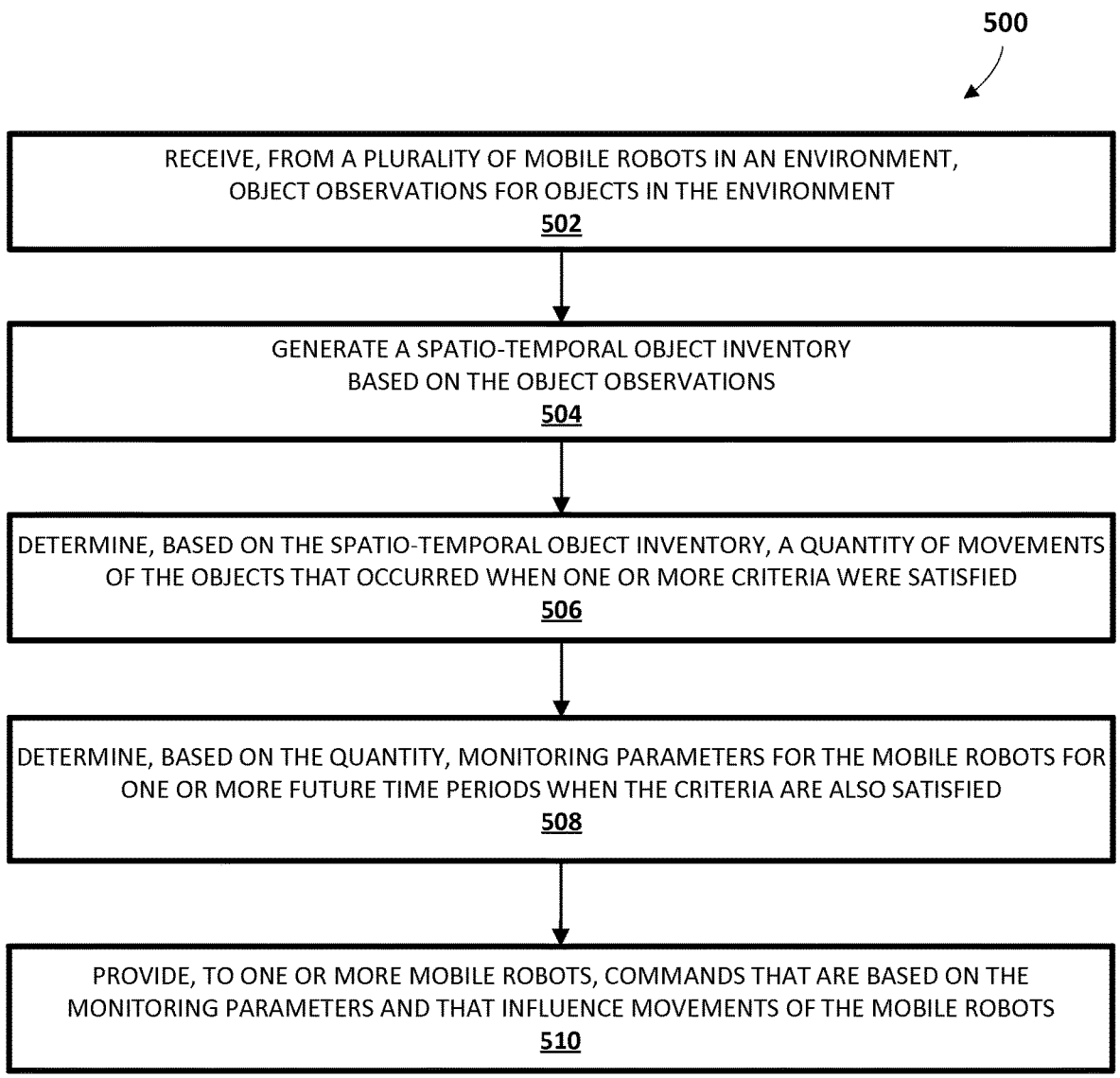
FIG. 5 depicts a flow chart illustrating an example method of generating a spatio-temporal object inventory based on object observations from mobile robots and determining, based on the spatio-temporal object inventory, monitoring parameters for the mobile robots for one or more future time periods.

FIG. 5 depicts a flow chart illustrating an example method of generating a spatio-temporal object inventory based on object observations from mobile robots and determining, based on the spatio-temporal object inventory, monitoring parameters for the mobile robots for one or more future time periods. For convenience, the operations of the flow chart are described with reference to a system that performs the operations. This system may include various components of various computer systems, such as spatio-temporal object inventory generation system 150 and/or robot commands generation system 160 of FIG. 1. Moreover, while operations of method 500 are shown in a particular order, this is not meant to be limiting. One or more operations may be reordered, omitted or added.

At block 502, the system receives, from a plurality of mobile robots in an environment, object observations for objects in the environment. Each of the object observations includes at least an identifier of an object and a measured object pose for the object.

At block 504, the system generates a spatio-temporal object inventory based on the object observations received at block 502. The generated spatio-temporal model defines the object pose and corresponding measurement time for each of a plurality of objects of the environment.

At block 506, the system determines, based on the spatio-temporal object inventory, a quantity of movements of the objects that occurred when one or more criteria were satisfied. The criteria may include, for example, one or more of: one or more particular temporal periods, presence of a particular group of one or more humans in the area, presence of one or more particular quantities of humans in the area, and/or inventory criteria.

At block 508, the system determines, based on the quantity of movements of the objects that occurred when one or more criteria were satisfied, monitoring parameters for the mobile robots for one or more future time periods when the criteria are also satisfied.

At block 510, the system provides, to one or more mobile robots, commands that are based on the monitoring parameters and that influence movements of the mobile robots at the future time periods.

Figure 6:
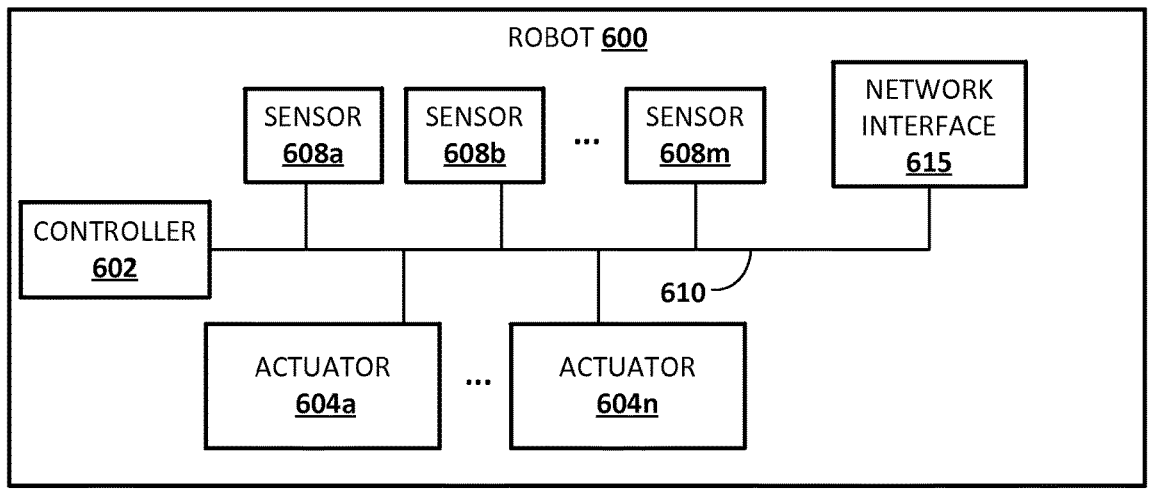
FIG. 6 schematically depicts an example architecture of a robot.

FIG. 6 schematically depicts an example architecture of a robot. Robot 600 may take various forms, including but not limited to a telepresence robot, a humanoid form, an animal form, a wheeled device, a submersible vehicle, an unmanned aerial vehicle ("UAV"), and so forth. In various implementations, robot 600 may include a controller 602. Controller 602 may take various forms, such as one or more processors, one or more field-programmable gate arrays ("FPGA"), one or more application-specific integrated circuits ("ASIC"), one or more so-called "real time controllers," and so forth.

In various implementations, controller 602 may be operably coupled with one or more actuators 604a-n and/or one or more sensors 608a-m, e.g., via one or more buses 610. Sensors 608a-m may take various forms, including but not limited to 3D sensors, cameras, depth sensors, light sensors, pressure sensors, pressure wave sensors (e.g., microphones), proximity sensors, accelerometers, gyroscopes, thermometers, barometers, and so forth. While sensors 608a-m are depicted as being integral with robot 600, this is not meant to be limiting. In some implementations, one or more sensors 608a-m may be located external to robot 600, e.g., as standalone units.

Controller 602 may provide control commands to the actuators 604a-n to accomplish one or more tasks. Those control commands include commands that direct the actuators 604a-n to drive wheels and/or other components to enable the robot 600 to traverse one or more paths autonomously, semi-autonomously, and/or in response to control commands provided by a computing device in response to user interface input at the computing device. Controller 602 may further provide control commands to generate all or aspects of object observations described herein, and/or receive one or more commands 145 provided by robot commands generation system 160 and generate one or more control commands that are based on the commands 145. For example, controller 602 may provide control commands to one or more actuators 604a-n to navigate the robot 600 to various locations in an environment autonomously, where those control commands are generated by the robot 600 in view of the commands 145. Also, for example, controller 602 may establish a network connection with spatio-temporal object inventory generation system 150 and/or robot commands generation system 160 via network interface subsystem 615. Network interface subsystem 615 provides an interface to outside networks and is coupled to one or more corresponding interface devices in one or more other computer systems such as a computing device engaged in a session with the robot. In some implementations, robot 600 may incorporate, in addition to other components, one or more aspects of a computer system, such as computer system 710 described below.

Figure 7:
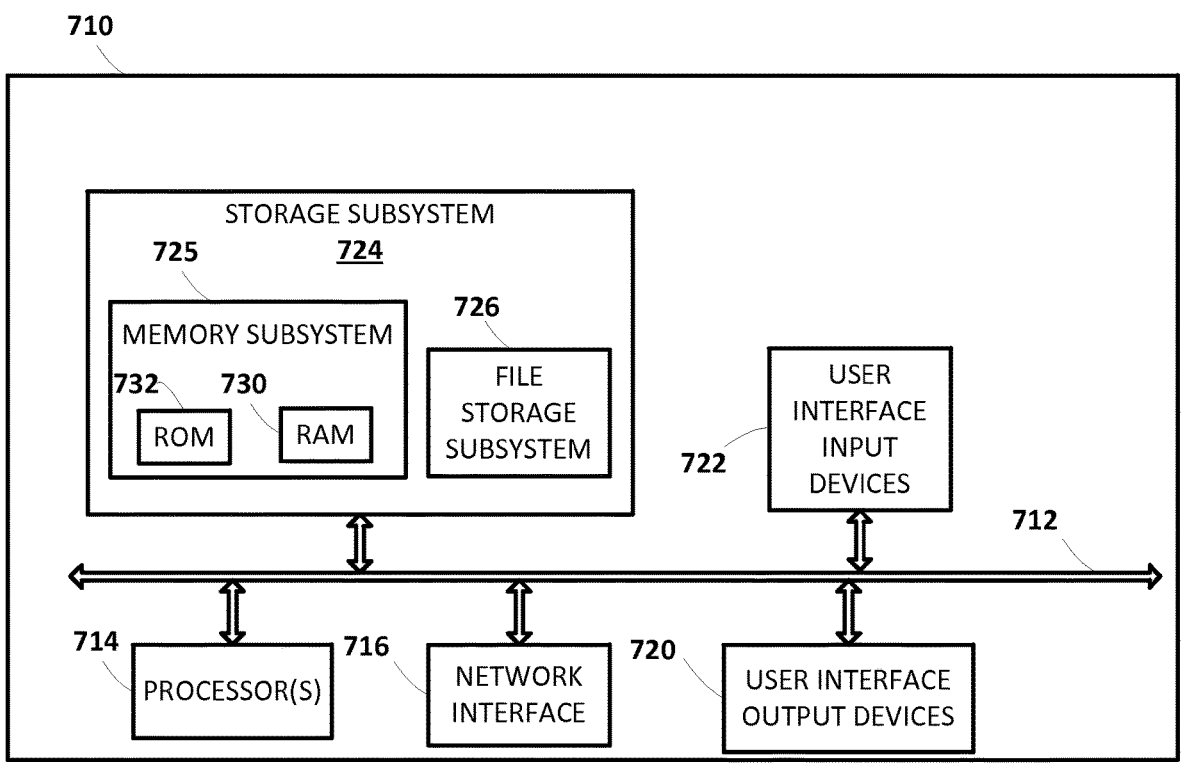
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500 and/or to implement one or more aspects of controller 602, engine 152, engine 154, engine 162, engine 164, and/or engine 166. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

What is claimed is:

1. A computer-implemented method, comprising:
    determining based on a spatio-temporal object inventory, a quantity of movements of objects that occurred in at least one area of a warehouse during a particular temporal period, wherein the spatio-temporal object inventory defines, for each of the objects, measurement information including a first pose for the object, a first measurement time at which the first pose was measured, a second pose for the object, and a second measurement time at which the second pose was measured, wherein a movement of the object is determined based, at least in part, on the measurement information for the object included in the spatio-temporal object inventory;
    determining, by one or more computing systems, based on the quantity of movements that occurred during the particular temporal period, one or more monitoring parameters for mobile robots for one or more future time periods, the one or more monitoring parameters defining, for the one or more future time periods, a number of the mobile robots that should be deployed to the at least one area of the warehouse and/or how often the mobile robots should be deployed to the at least one area of the warehouse; and
    providing, to one or more of the mobile robots, commands based on the one or more monitoring parameters, wherein the commands influence one or more aspects of movements of the mobile robots at the one or more future time periods.

2. The computer-implemented method of claim 1, wherein the particular temporal period is one of: one or more particular days of a week, one or more particular days of a year, or one or more time periods during one or more of the particular days of the week or one or more of the particular days of the year.

3. The computer-implemented method of claim 1, wherein the commands that influence one or more aspects of movements of the mobile robots at the one or more future time periods based on the monitoring parameters include commands that direct the mobile robots to the at least one area during the one or more future time periods.

4. The computer-implemented method of claim 1, wherein the commands that influence one or more aspects of movements of the mobile robots at the one or more future time periods based on the monitoring parameters include commands that increase a likelihood that the mobile robots will select a path that diverts from an optimal path and encounters the at least one area during the one or more future time periods.

5. The computer-implemented method of claim 1, wherein determining a quantity of movements of objects that occurred in at least one area of the warehouse during the particular temporal period comprises determining a quantity of movements of objects into the at least one area and/or out of the least one area during the particular temporal period.

6. The computer-implemented method of claim 5, wherein determining a quantity of movements of the objects into the at least one area during the particular temporal period is based on:
    determining that the first pose for a selected object of the objects, is outside of the at least one area and the first corresponding measurement time is temporally before the particular temporal period; and
    determining that the second pose for the selected object, is within the at least one area and the second corresponding measurement time is temporally within the particular temporal period.

7. The computer-implemented method of claim 5, wherein determining a quantity of movements of the objects into the at least one area during the particular temporal period is based on:
    determining that no pose that is temporally before the particular temporal period is defined for a selected object of the objects in the spatio-temporal object inventory; and
    determining that the first pose or the second pose for the selected object is within the at least one area and has a corresponding first measurement time or second measurement time temporally within the particular temporal period.

8. The computer-implemented method of claim 5, wherein determining a quantity of movements of the objects out of the at least one area during the particular temporal period is based on:
    determining that the first pose for a selected object of the objects, is inside the at least one area and the first corresponding measurement time is temporally before the particular temporal period; and
    determining that the second pose for the selected object is outside of the at least one area and the second corresponding measurement time is temporally within the particular temporal period.

9. A system comprising:
    a plurality of mobile robots configured to travel within a warehouse; and
    one or more computing systems comprising instructions that, when executed by the one or more computing systems, cause the one or more computing systems to:

determine, based on a spatio-temporal object inventory, a quantity of movements of objects that occurred in at least one area of the warehouse during a particular temporal period, wherein the spatio-temporal object inventory defines, for each of the objects, measurement information including a first pose for the object, a first measurement time at which the first pose was measured, a second pose for the object, and a second measurement time at which the second pose was measured, wherein a movement of the object is determined based, at least in part, on the measurement information for the object included in the spatio-temporal object inventory;

determine, based on the quantity of the movements that occurred during the particular temporal period, one or more monitoring parameters for one or more of the plurality of mobile robots for one or more future time periods, the one or more monitoring parameters defining, for the one or more future time periods, a number of the mobile robots that should be deployed to the at least one area of the warehouse and/or how often the mobile robots should be deployed to the at least one area of the warehouse; and provide, to the one or more of the mobile robots, commands based on the one or more monitoring parameters, wherein the commands influence one or more aspects of movements of the one or more mobile robots at the one or more future time periods.

10. The system of claim 9, wherein the particular temporal period is one of: one or more particular days of a week, one or more particular days of a year, or one or more time periods during one or more of the particular days of the week or one or more of the particular days of the year.

11. The system of claim 9, wherein determining a quantity of movements of objects that occurred in at least one area of the warehouse during the particular temporal period comprises determining a quantity of movements of objects into the at least one area and/or out of the least one area during the particular temporal period.

12. The system of claim 11, wherein determining a quantity of movements of the objects into the at least one area during the particular temporal period is based on:
  determining that the first pose for a selected object of the objects, is outside of the at least one area and the first corresponding measurement time is temporally before the particular temporal period; and
  determining that the second pose for the selected object, is within the at least one area and the second corresponding measurement time is temporally within the particular temporal period.

13. The system of claim 11, wherein determining a quantity of movements of the objects into the at least one area during the particular temporal period is based on:
  determining that no pose that is temporally before the particular temporal period is defined for a selected object of the objects in the spatio-temporal object inventory; and
  determining that the first pose and/or the second pose for the selected object is within the at least one area and has a corresponding first and/or second measurement time temporally within the particular temporal period.

14. The system of claim 11, wherein determining a quantity of movements of the objects out of the at least one area during the particular temporal period is based on:
  determining that the first pose for a selected object of the objects, is inside the at least one area and the first corresponding measurement time is temporally before the particular temporal period; and
  determining that the second pose for the selected object is outside of the at least one area and the second corresponding measurement time is temporally within the particular temporal period.

* * * * *